(12) United States Patent
Sendelweck

(10) Patent No.: US 6,876,398 B1
(45) Date of Patent: Apr. 5, 2005

(54) CONTROL OF SCANNING VELOCITY MODULATION

(75) Inventor: Gene Karl Sendelweck, Indianapolis, IN (US)

(73) Assignee: Thomson Licensing S.A., Boulogne-Billancourt (FR)

(*) Notice: Subject to any disclaimer, the term of this patent is extended or adjusted under 35 U.S.C. 154(b) by 0 days.

(21) Appl. No.: 09/914,118

(22) PCT Filed: Feb. 4, 2000

(86) PCT No.: PCT/US00/03032
§ 371 (c)(1),
(2), (4) Date: Aug. 23, 2001

(87) PCT Pub. No.: WO00/51340
PCT Pub. Date: Aug. 31, 2000

(51) Int. Cl.$^7$ ............................................. H04N 5/208
(52) U.S. Cl. ..................... 348/626; 348/625; 348/627
(58) Field of Search ............................. 348/626, 628, 348/629, 440, 625; 315/387, 389, 403, 397

(56) References Cited

U.S. PATENT DOCUMENTS

| 5,072,300 | A | * | 12/1991 | Anderson | 348/626 |
| 5,196,941 | A | * | 3/1993 | Altmanshofer | 348/626 |
| 5,351,094 | A | * | 9/1994 | Washino | 348/626 |
| 5,528,312 | A | | 6/1996 | No et al. | 348/626 |
| 6,340,995 | B1 | * | 1/2002 | Allender et al. | 348/626 |
| 6,493,040 | B1 | * | 12/2002 | Miller | 348/626 |

FOREIGN PATENT DOCUMENTS

EP  469 567 A2  2/1992  ............ H04N/3/32

OTHER PUBLICATIONS

Search Report*.

* cited by examiner

Primary Examiner—John Miller
Assistant Examiner—Trang U. Tran
(74) Attorney, Agent, or Firm—Joseph S. Tripoli; Harvey D. Fried; Francis A. Davenport

(57) ABSTRACT

A scanning velocity modulation deflection signal generator comprises a variable conduction device coupled to said scanning velocity modulation deflection signal generator. In a first condition the variable conduction device provides a feedback path to control a scanning velocity modulation deflection signal, and in a second condition the variable conduction device interrupts the feedback path and inhibits generation of the scanning velocity modulation deflection signal.

12 Claims, 4 Drawing Sheets

CONTROL OF SCANNING VELOCITY MODULATION

This application claims the benefit under 35 U.S.C. § 365 of International Application PCT/US00/03032, filed Feb. 4, 2000, which claims the benefit of U.S. Provisional Application No. 60/121,971, filed Feb. 26, 1999.

This invention relates to scanning velocity modulation (SVM) systems for enhancing picture sharpness and more particularly to a scanning velocity modulation control circuit integrated in an SVM system.

BACKGROUND OF THE INVENTION

It is well known that SVM systems may enhance cathode ray tube picture sharpness by modulating the scanning velocity of an electron beam based on a differentiated video signal, or SVM signal, derived from the luminance component of a video display signal. Slowing the scanning velocity of the electron beam causes a greater number of electrons to land at a particular point in the display resulting in a brighter picture at that particular location on the display. In contrast, increasing the velocity of the electron beam results in fewer electrons striking the display which leads to a darker picture at that particular location. The net effect of such modulation causes variations in display intensity about edge transitions in the picture resulting in the perception of increased picture sharpness. It is desirable, however, to disable SVM operation under certain conditions, for example, when channels are being changed, computer images displayed or when on screen display (OSD) message signals are generated for display. In addition, the output stages of an SVM circuit must be controlled to prevent over dissipation (excessive temperatures) in those stages.

Various schemes have been used to accomplish these objectives. For example, SVM systems are known which include a control circuit for protecting output stage devices and a disabling circuit for disabling an SVM circuit during OSD operation. It is also known to control SVM signal amplitude in accordance with output stage current to prevent excessive dissipation in output stage devices. Such systems, however, suffer from several disadvantages. However, SVM inhibition and the prevention of over dissipation are facilitated by separate, independent systems which leads to a greater number of components and increased costs.

Thus, what is needed is an SVM control circuit that accomplishes both of these important objectives through the use of a minimum number of components. Reducing the number of parts that is needed to successfully operate an SVM system leads to lower costs.

SUMMARY OF THE INVENTION

A scanning velocity modulation deflection signal generator comprises a variable conduction device coupled to said scanning velocity modulation deflection signal generator. In a first condition the variable conduction device provides a feedback path to control a scanning velocity modulation deflection signal, and in a second condition the variable conduction device interrupts the feedback path and inhibits generation of the scanning velocity modulation deflection signal.

DETAILED DESCRIPTION

Figure 1:
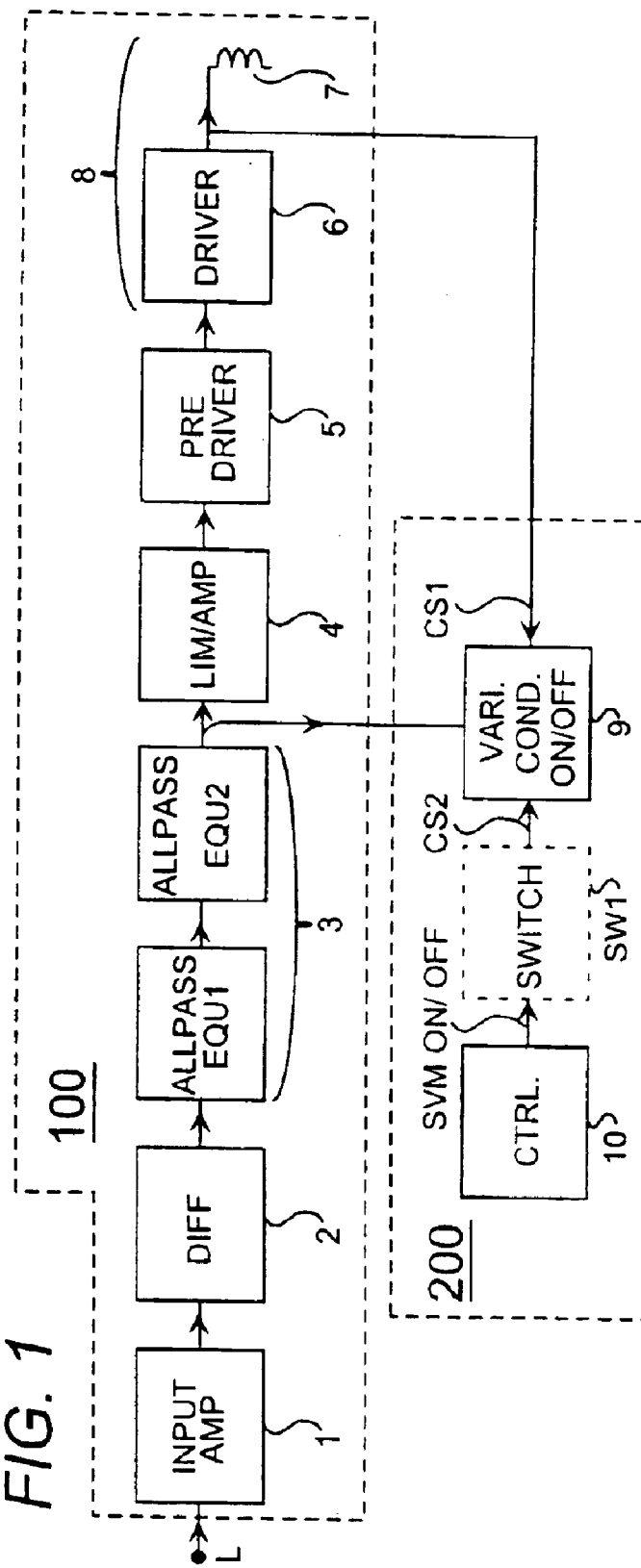
FIG. 1 is a block diagram of an SVM system employing an SVM circuit and including an inventive SVM control arrangement.

In FIG. 1, a luminance video signal L is applied to SVM circuit 100 which generates an SVM deflection signal that modulates the speed of a scanning electron beam (not shown). SVM control circuit 200 controls SVM circuit 100 to prevent over dissipation in the output stages of SVM circuit 100 and enables or disables SVM circuit 100 when it senses a display condition not requiring SVM display enhancement. More specifically, luminance video signal L enters amplifier stage 1 which is coupled to differentiator circuit 2 whereby luminance video signal L is amplified and differentiated. Next, the differentiated video signal, or SVM signal, is applied to delay stage 3 where it passes through all pass equalizers 1 and 2. Delay stage 3 delays the SVM signal to provide synchronization at output stage 8 with its corresponding displayed luminance signal. Once the SVM signal has been delayed, it enters limiting amplifier stage 4 which amplifies the SVM signal and limits its peak-to-peak voltage to protect downstream components. The SVM signal is then applied to pre-driver stage 5 which drives output stage 8 and provides noise coring. Driver 6 then converts the SVM signal into a SVM deflection signal that is used to drive SVM coil 7.

Variable conduction switch 9 is coupled to SVM circuit 100 at the input of limiting amplifier stage 4 and at the output of driver 6 in output stage 8.

Variable conduction switch 9 can operate as a variable conductance device to control SVM signal amplitude responsive to control signal CS1 thereby preventing over dissipation in output stage 8 by diverting a portion of the SVM signal from circuit 100 to ground. In addition, variable conduction switch 9 is controlled by control signal CS2 which enables or disables SVM circuit 100. When control circuitry 10 determines an SVM OFF or non-SVM enhancement condition, for example, a channel change, input signal selection or OSD message insertion, control block 10 changes the state of the SVM ON/OFF control signal. With the termination of the SVM OFF or non-SVM enhancement condition SVM ON/OFF state is toggled and reestablishes SVM circuit 100 operation, restoring feed back control of output power dissipation. A switch SW1 is depicted with a dotted outline to denote that the switching function can be facilitated within controller 10 or my means of an external switching device.

Figure 2:
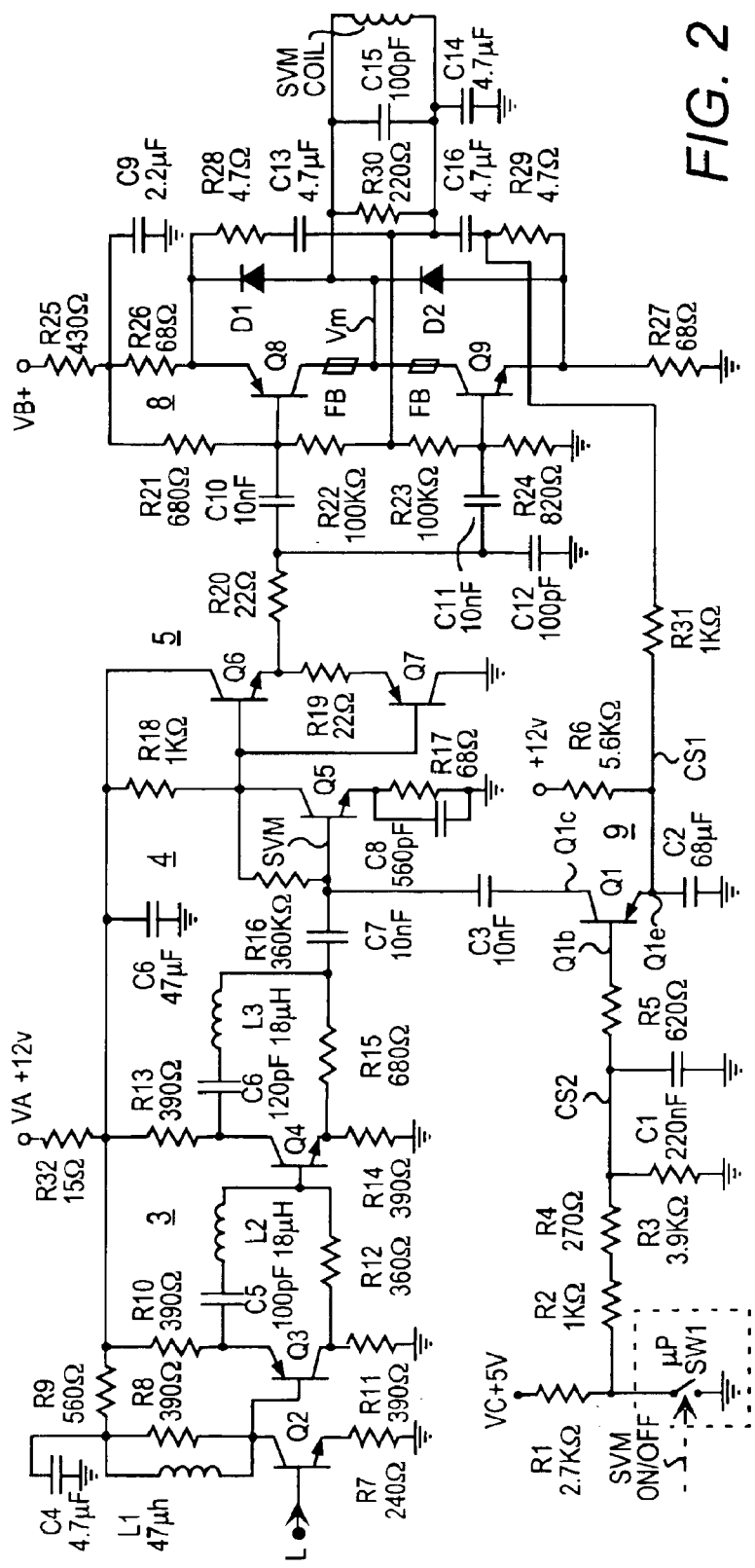
FIG. 2 is a detailed circuit diagram of the SVM system of FIG. 1.

FIG. 2 illustrates the circuitry of FIG. 1, including a detailed embodiment of SVM circuit 100 and SVM control circuit 200. In FIG. 2, luminance video signal L is amplified by transistor Q2 and differentiated in the collector circuit by inductor L1. The emitter electrode of transistor Q2 is coupled to ground via resistor R7 and the collector is coupled through resistor R8 to a source of operating potential +VA, for example, 12 volts. Operating potential +VA is decoupled by resistor R9 in series with decoupling capacitor C4. The collector electrode of transistor Q2 is also coupled to the base electrode of transistor Q3. Transistor Q3, capacitor C5, inductor L2 and resistors R11 and R12 form the first of complementary all pass equalizers 1 and 2 with transistor Q4, capacitor C6, inductor L3 and resistors R14 and R15 forming the second. The output of all pass equalizer 1 is coupled to the base electrode of transistor Q4. All pass equalizers 1 and 2 combine to form delay stage 3 which delays the SVM signal by 270 ns to compensate for the delay introduced into the SVM signal's corresponding luminance component by the luminance processing circuitry (not pictured). The emitter electrode of transistor Q3 is coupled to supply voltage +VA through resistor R10, and the collector electrode of transistor Q4 is coupled to supply voltage +VA through resistor R13. Power supply +VA is further decoupled by resistor R32 in series with decoupling capacitor C6.

The output of all pass equalizer 2 is AC coupled through capacitor C7 to the base electrode of transistor Q5 which operates as a high-gain limiting amplifier. Resistor R16 sets the bias for the transistor. Limiting amplifier stage 4 limits the peak-to-peak voltage of the SVM signal thus providing extra protection for successive transistors in SVM circuit 100. Transistor Q1 is AC coupled via capacitor C3 to the input of limiting amplifier stage 4 and, as will be further explained in greater detail, provides negative feedback to prevent over dissipation in output stage 8 and in addition acts as an on/off or inhibit switch for SVM circuit 100. The collector electrode of transistor Q5 is coupled to supply voltage +VA through resistor R18 and is also coupled to the input of pre-driver stage 5. Bypass capacitor C8 in conjunction with resistor R17 provides increased voltage gain as the frequency of the SVM signal increases.

Pre-driver stage 5 includes complementary type, emitter follower transistors Q6 and Q7 with the base electrode of Q6 coupled to the base electrode of Q7, both base electrodes coupled to the collector electrode of transistor Q5. The emitter electrode of Q6 is coupled via resistor R19 to the emitter electrode of transistor Q7. Transistors Q6 and Q7 form a Class B amplifier which operates to drive output stage 8 and additionally provides noise coring, that is, only SVM signals greater in magnitude than approximately ±0.7 volts are coupled because of the Class B configuration which in turn causes low-level noise components to be removed from the SVM signal.

The output of pre-driver stage 5 is AC coupled through capacitors C10 and C11 to the base electrodes of transistors Q8 and Q9, with resistor R20 and capacitor C12 filtering the output to reduce RFI. The emitter electrode of transistor Q8 is directed through resistor R26 to a relatively high source of operating potential, +VB, generally ranging from 120–180 volts. Supply voltage +VB is decoupled by resistor R25 in series with decoupling capacitor C9. Resistors R21, R22, R23 and R24 form a series connected potential divider coupled between supply voltage +VB and ground. Transistors Q8 and Q9 operate as a Class B amplifier with the bases biased at cut off by the resistive divider R21, R22, R23 and R24. Resistor R26 and R27 set the turn on voltage for transistors Q8 and Q9 respectively and limit power dissipation in output stage 8. Resistor R28 and capacitor C13 are coupled to the emitter electrode of transistor Q8, and, similarly, resistor R29 and capacitor C16 are coupled to the emitter electrode of transistor Q9. These feedback paths are configured to circulate pulse current mainly within output stage 8 to limit unwanted, extraneous crosstalk components. When transistor Q8 is on, current flows through R28, C13, and SVM coil 7 to generate the necessary deflection field for one polarity of scanning velocity modulation. Conversely, when transistor Q9 is on, current flow through R29, C16, and SVM coil 7 generates the deflection field of the opposite polarity. To prevent unwanted resonance in SVM coil 7, resistor R30 and capacitor C15 are coupled in shunt with the coil. Clamping diodes D1 and D2 prevent the peak-to-peak ratings of transistors Q8 and Q9 from being exceeded, and ferrite beads located on the collector electrodes of transistors Q8 and Q9 aid in limiting spurious radiation in output stage 8.

The collector electrode of transistor Q1 is AC coupled via capacitor C3 to the input of limiting amplifier stage 4, and the emitter electrode is coupled via resistor R31 to output stage 8 at the junction of resistor R29 and capacitor C16. The emitter electrode is also coupled to supply voltage +VA through resistor R6 which supplies a current source for transistor Q1. Capacitor C2 is coupled to the emitter electrode and together with resistor R31 forms a lowpass filter for filtering high frequency components and noise from SVM coil driver stage 8. High output power due to high SVM deflection signal levels in output stage 8 results in high current flow through resistor R27 which causes voltage CS1 at the emitter of transistor Q1 to rise. Transistor Q1 turns on and will conduct a portion of the SVM signal at the input of limiting amplifier stage 4 through C3 and C2 to ground. This action forms a negative feedback loop which leads to a reduction in the level of the SVM deflection signal and, accordingly, the power level in output stage 8 and consequently lowers voltage CS1 at the emitter of transistor Q1. Depending on the level of output power, transistor Q1 may achieve steady state operation or enter the cut off state. If output power continues to increase, the voltage at the emitter will continue to rise and transistor Q1 will accordingly divert a greater amount of the SVM signal through capacitors C3 and C2 to ground thus preventing over dissipation in output stage 8. The values of resistors R6 and R31 are chosen to control the maximum permissible temperature of the output devices in output stage 8, and the value of resistor R5 is chosen to attenuate the SVM signal level symmetrically.

The base electrode of transistor Q1 is coupled through resistors R1, R2, R4 and R5 to a source of operating potential +VC, typically 5 volts. Resistors R1, R2, R3 and R4 form a potential divider which, in conjunction with resistor R5, partially determines the current in the base of transistor Q1. Capacitor C1 is coupled to a point between resistors R5 and R4 to provide decoupling and prevent inadvertent switching of transistor Q1. Control circuitry 10 detects display conditions in which SVM action is inhibited, for example during a channel change, input selection or OSD message insertion. Control circuitry 10 can be any switchable logic or control circuitry. For example, the display control microprocessor, controls operation of the display device and can identify operational conditions requiring SVM inhibition. Furthermore controller 10 can provide a switching function, for example providing a grounded, low impedance condition or a high impedance condition, as depicted by switch SW1 or can output a suitable control signal, SVM ON/OFF, for enabling or disabling a physical switching device SW1. According to a preferred embodiment, control circuitry 10 is a microprocessor. In normal operation, that is, when controller 10 does not detect an SVM inhibit condition, controller 10 outputs SVM ON/OFF control signal with a high impedance condition. The SVM ON/OFF control signal can be directly coupled, as shown, to the junction of resistors R1 and R2, or may be coupled to control a physical switching device SW1. Thus with the SVM ON/OFF signal in a high impedance condition, or switch SW1 is open, the bias voltage from +VC is applied to the base of transistor Q1 via potential divider formed by resistors R1, R2, R4, and R3. If the power dissipation in output stage 8 is low, transistor Q1 remains in cut off and the SVM signal at transistor Q5 base is unaffected.

When control circuitry 10 detects an SVM inhibit condition, controller 10 changes the state of the SVM ON/OFF control signal which becomes a low impedance to ground. Thus the SVM ON/OFF signal can directly ground the junction of resistors R1 and R2, or close switch SW1, resulting in the base voltage, CS2, of transistor Q1 being pulled low. As a result, transistor Q1 turns on and conducts the SVM signal through capacitor C3 and C2 and, to a lesser extent C1, to ground thus substantially removing the SVM signal from the base of transistor Q5 and inhibiting SVM action. Once the SVM off condition terminates, the SVM ON/OFF signal reverts to a high impedance condition effectively openings switch SW1 and allowing the voltage at the base of transistor Q1 rise and, so long as output power remains low, transistor Q1 remains off.

Figure 3:
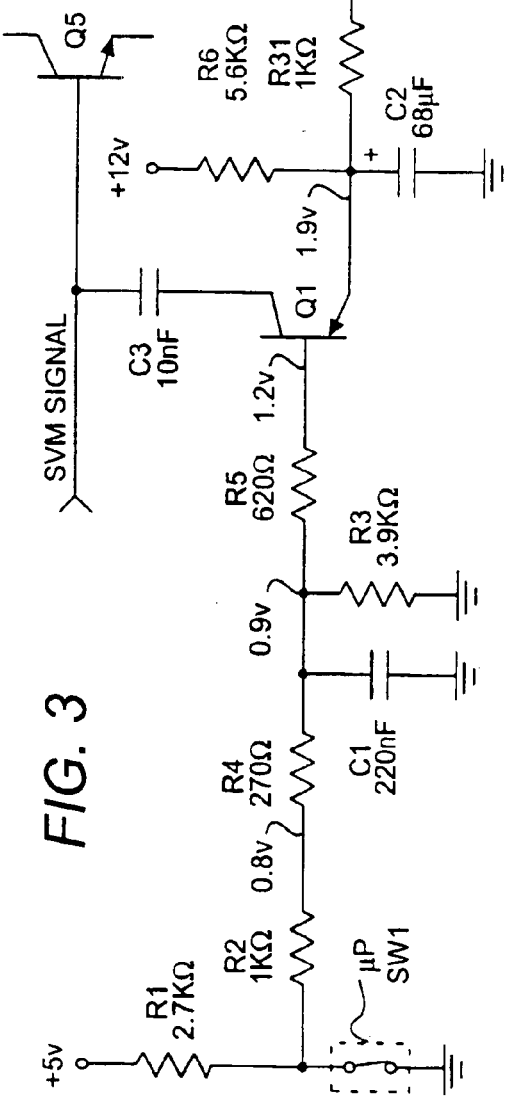
FIG. 3 is a circuit diagram of the SVM control circuit of FIG. 2 with the SVM circuit of FIG. 2 disabled and low output power at the output stage.
Figure 4:
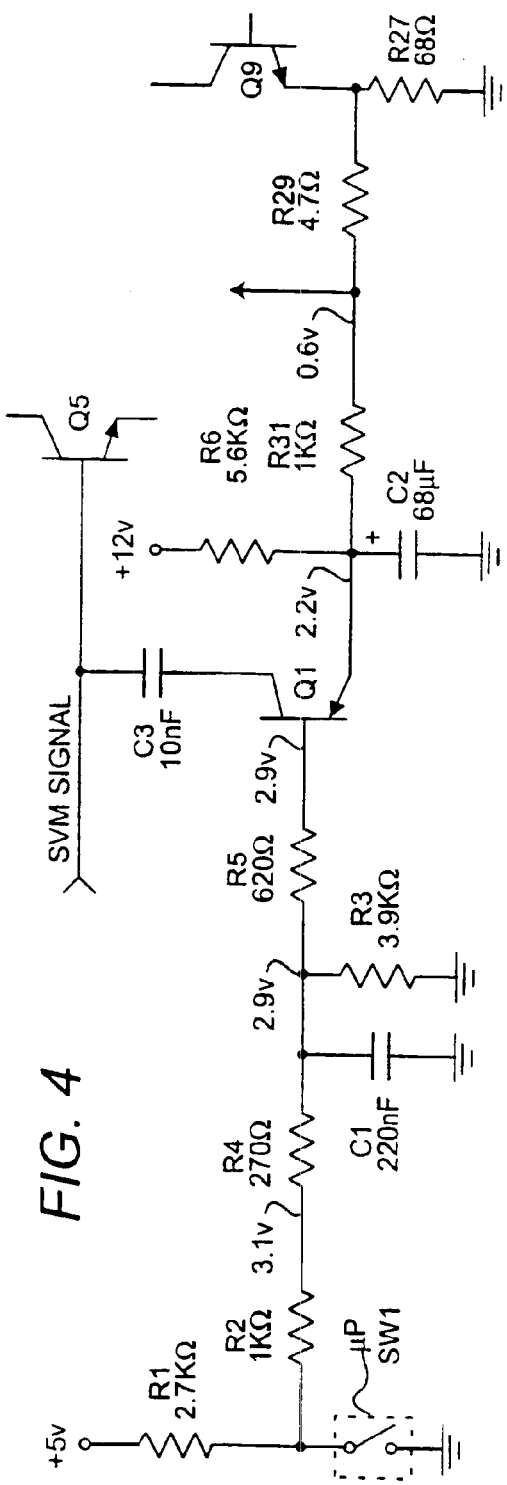
FIG. 4 is a circuit diagram of the SVM control circuit of FIG. 2 with the SVM circuit of FIG. 2 enabled and low output power at the output stage.
Figure 5:
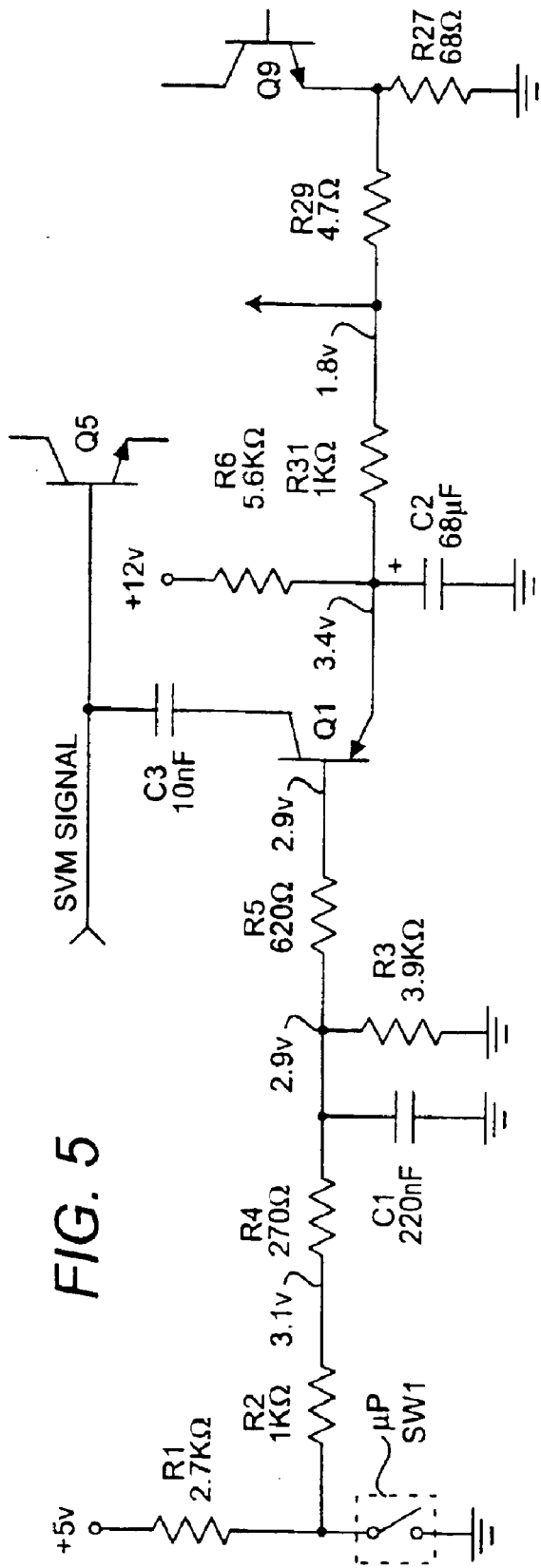
FIG. 5 is a circuit diagram of the SVM control circuit of FIG. 2 with the SVM circuit of FIG. 2 enabled and high output power at the output stage.

FIG. 3 depicts the operation of SVM control system 200 when output power is low and SVM ON/OFF is a low impedance, or switch SW1 is closed. Because the base voltage of transistor Q1 is low, transistor Q1 turns on and couples the SVM signal from the input of the limiting amplifier transistor Q5 through capacitors C3 and C2 or C1 to ground. This inhibits SVM operation in SVM circuit 100 during computer image display, channel change or OSD message display. FIG. 4 illustrates the normal operation of SVM control circuit 200. Output power remains low, and switch SW1 is now open thus allowing a higher biasing voltage to be applied to the base of transistor Q1. Because output power is low, the voltage at the emitter is not high enough to turn on transistor Q1 and, the SVM circuit is enabled. In FIG. 5, switch SW1 is open and the SVM circuit is operational. High output power in output stage 8 causes an increase in current flow through resistor R27, and the voltage at the emitter of transistor Q1 starts to rise. Eventually, transistor Q1 turns on and begins to variably conduct current from the input of transistor Q5 through capacitors C3 and C2 to ground. As the voltage at the emitter of transistor Q1 continues to rise, the transistor will conduct an even greater amount of current from SVM circuit 100 to ground.

What is claimed is:

1. A generator of a scanning velocity modulation deflection signal, comprising:
   a variable conduction device comprising a transistor, said transistor coupled to said generator and having a first input responsive to a negative feedback signal, and said transistor having a second input responsive to a control signal;
   in a first condition said transistor providing a path for receiving said negative feedback signal at said first input for controlling said scanning velocity modulation deflection signal in magnitude; and,
   in a second condition said transistor interrupting said path and substantially inhibiting generation of said scanning velocity modulation deflection signal in response to said second input receiving said control signal.

2. The generator of claim 1, wherein during said first condition said transistor varies conduction in accordance with a magnitude of said negative feedback signal.

3. The generator of claim 2, wherein said transistor varies conduction to variably attenuate said scanning velocity modulating signal in accordance with said negative feedback signal magnitude.

4. The generator of claim 1, wherein during said second condition said transistor is fully conductive responsive to said control signal for substantially inhibiting said scanning velocity modulation deflection signal.

5. The generator of claim 1, wherein during said second condition said transistor is fully conductive, attenuating said negative feedback signal-and substantially inhibiting generation of said scanning velocity modulation deflection signal said.

6. The generator of claim 1, wherein said second condition conduction in said transistor is unresponsive to said negative feedback signal.

7. A generator of a scanning velocity modulation deflection signal, comprising:
   a variable conduction device consisting of a single transistor, said transistor having a first terminal responsive to a scanning velocity modulation feedback signal, and a second terminal responsive to a control signal;
   in a first condition said transistor providing a feedback path for said feedback signal for controlling a magnitude of said scanning velocity modulation deflection signal; and,
   in a second condition said transistor interrupting said feedback path and substantially inhibiting generation of said scanning velocity modulation deflection signal.

8. A scanning velocity modulation deflection signal generator, comprising:
   a transistor coupled to said scanning velocity modulation deflection signal generator and operational as a common base amplifier for a feedback signal coupled for controlling a magnitude of said scanning velocity modulation deflection signal, and said transistor being operational as a common emitter amplifier for interrupting said feedback signal and substantially inhibiting generation of said scanning velocity modulation deflection signal.

9. The generator of claim 1, wherein said negative feedback signal is representative of power dissipation in a scanning velocity modulation drive amplifier responsive to said scanning velocity modulation deflection signal.

10. The scanning velocity modulation deflection signal generator of claim 7, wherein said second condition a signal input to said generator is attenuated to substantially inhibit said scanning velocity modulation deflection signal generation.

11. The scanning velocity modulation deflection signal generator of claim 8, wherein said negative feedback signal is representative of power dissipation in a scanning velocity modulation drive amplifier responsive to said scanning velocity modulation deflection signal.

12. The scanning velocity modulation deflection signal generator of claim 8, wherein said common emitter amplifier substantially inhibits generation of said scanning velocity modulation deflection signal by attenuating a signal input to said generator.

* * * * *